US010359680B2

(12) United States Patent
Garcia et al.

(10) Patent No.: US 10,359,680 B2
(45) Date of Patent: Jul. 23, 2019

(54) POST-TEMPERABLE NANOCRYSTAL ELECTROCHROMIC DEVICES (71) Applicant: HELIOTROPE TECHNOLOGIES, INC., Alameda, CA (US)

(72) Inventors: Guillermo Garcia, Oakland, CA (US); Jason Holt, Larkspur, CA (US); Scott Thomsen, South Lyon, MI (US)

(73) Assignee: HELIOTROPE TECHNOLOGIES, INC., Alameda, CA (US)

( * ) Notice: Subject to any disclaimer, the term of this patent is extended or adjusted under 35 U.S.C. 154(b) by 29 days.

(21) Appl. No.: 15/839,421

(22) Filed: Dec. 12, 2017

(65) Prior Publication Data

US 2018/0164650 A1    Jun. 14, 2018

Related U.S. Application Data (63) Continuation of application No. 14/882,319, filed on Oct. 13, 2015, now Pat. No. 9,864,250.

(51) Int. Cl.
*G02F 1/155* (2006.01)
*B32B 17/06* (2006.01)
(Continued)

(52) U.S. Cl.
CPC .............. *G02F 1/155* (2013.01); *B32B 17/06* (2013.01); *C03B 27/00* (2013.01); *C03C 17/007* (2013.01);
(Continued)

(58) Field of Classification Search
CPC .... G02F 1/155; G02F 1/1523; G02F 2202/36; G02F 2001/1555; B23B 17/06;
(Continued)

(56) References Cited

U.S. PATENT DOCUMENTS 7,150,916 B2    12/2006    Lemmer et al.
7,217,461 B2    5/2007    Ferreira et al.
(Continued)

FOREIGN PATENT DOCUMENTS

KR    1020140127695 A    4/2014

OTHER PUBLICATIONS

Lee, D. C. et al., "Synthesis and Magnetic Properties of Silica-Coated FePt Nanocrystals," J. Phys. Chem B, vol. 110, pp. 111160-11166, (2006).

(Continued)

*Primary Examiner* — Jack Dinh
(74) *Attorney, Agent, or Firm* — The Marbury Law Group, PLLC (57) ABSTRACT An electrochromic device may include a working electrode that includes a high temperature stable material and nanoparticles of an active core material, a counter electrode, and an electrolyte deposited between the working electrode and the counter electrode. The high temperature stable material may prevent fusing of the nanoparticles of the active core material at temperatures up to 700° C. The high temperature stable material may include tantalum oxide. The high temperature stable material may form a spherical shell or a matrix around the nanoparticles of the active core material. A method of forming an electrochromic device may include depositing a working electrode onto a first substrate, in which the working electrode comprises a high temperature stable material and nanoparticles of an active core material, and heat tempering the working electrode and the first substrate.

24 Claims, 9 Drawing Sheets

Related U.S. Application Data (60) Provisional application No. 62/203,679, filed on Aug. 11, 2015, provisional application No. 62/079,850, filed on Nov. 14, 2014.

(51) Int. Cl.
| | | |
|---|---|---|
| *C03C 17/23* | (2006.01) | |
| *C03B 27/00* | (2006.01) | |
| *G02F 1/15* | (2019.01) | |
| *C03C 17/00* | (2006.01) | |
| *G02F 1/1523* | (2019.01) | |

(52) U.S. Cl.
CPC ............ *C03C 17/23* (2013.01); *G02F 1/1523* (2013.01); *C03C 2217/42* (2013.01); *C03C 2217/70* (2013.01); *G02F 2001/1555* (2013.01); *G02F 2202/36* (2013.01)

(58) Field of Classification Search
CPC ... C03C 17/23; C03C 17/007; C03C 2217/70; C03C 2217/42; C03B 27/00
See application file for complete search history.

(56) References Cited

U.S. PATENT DOCUMENTS

| | | |
|---|---|---|
| 7,521,096 B2 | 4/2009 | Lemmer et al. |
| 8,097,342 B2 | 1/2012 | Thomsen et al. |
| 8,142,622 B2 | 3/2012 | Ferreira et al. |
| 8,609,260 B2 | 12/2013 | Nunez-Regueiro et al. |
| 9,791,760 B2 | 10/2017 | Garcia et al. |
| 9,864,250 B2 | 1/2018 | Garcia et al. |
| 2006/0132885 A1 | 6/2006 | Pichot et al. |
| 2008/0128287 A1 | 6/2008 | Wu et al. |
| 2010/0206461 A1 | 8/2010 | Murray et al. |
| 2012/0176016 A1 | 7/2012 | Bonitatibus, Jr. et al. |

OTHER PUBLICATIONS

Adachi, K. et al., "Activation of Plasmons and Polarons in Solar Control Cesium Tungsten Bronze and Reduced Tungsten Oxide Nanoparticles," J. Mater. Res., vol. 27, No. 6, pp. 965-970, (2012).

Gordon, T. R., et al., "Shape-Dependent Plasmonic Response and Directed Self-Assembly in a New Semiconductor Building Block, Indium-Doped Cadmium Oxide (ICO)," Nano Lett., vol. 13, pp. 2857-2863, (2013).

Kriegel, I. et al., "Shedding Light on Vacancy-Doped Copper Chalcogenides: Shape-Controlled Synthesis, Optical Properties, and Modeling of Copper Telluride Nanocrystals with Near-Infrared Plasmon Resonances," ACS Nano, vol. 7, No. 5, pp. 4367-4377, (2013).

Noguez, C., "Surface Plasmons on Metal Nanoparticles: The Influence of Shape and Physical Environment," J. Phys. Chem., vol. 111, pp. 3806-3819, (2007).

Oh, M. H., "Large-Scale Synthesis of Bioinert Tantalum Oxide Nanoparticles for X-ray Computed Tomography Imaging and Bimodal Image-Guided Sentinel Lymph Node Mapping," J. Am. Chem. Soc., vol. 133, pp. 5508-5515, (2011).

International Application No. PCT/US2015/0055326, International Preliminary Report on Patentability and Written Opinion, dated May 26, 2017, 11pgs.

Bright Mode

Dark Mode

POST-TEMPERABLE NANOCRYSTAL ELECTROCHROMIC DEVICES

RELATED APPLICATIONS

This application is a continuation of U.S. application Ser. No. 14/882,319, filed Oct. 13, 2015, which claims the benefit of priority to U.S. Provisional Patent Application No. 62/079,850, filed Nov. 14, 2014, and U.S. Provisional Patent Application No. 62/203,679, filed Aug. 11, 2015, the entire contents of which are incorporated herein by reference.

FIELD

The present invention is generally directed to electrochromic devices, and more particularly to particular nanocrystalline materials and process conditions that allow thermally-cured electrodes to be subjected to tempering conditions.

BACKGROUND OF THE INVENTION

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. An electrochromic (EC) window coating overcomes these limitations by enhancing the window performance in all climates. EC window coatings undergo a reversible change in optical properties when driven by an applied potential. Some EC devices may include a working electrode, a solid state electrolyte, and a counter electrode sandwiched between two transparent conductor layers and an outer glass layer. The working electrode may include nanocrystalline structures or amorphous metal oxide nanoparticles such as $WO_3$, $CS_xWO_3$, $NbO_x$, $TiO_2$, $MoO_3$, $NiO_2$, and $V_2O_5$.

As part of the EC device fabrication process, the working electrode, solid state electrolyte, and counter electrode may be exposed to high temperatures as part of a tempering or heat quench process. For example, the EC device layers may be exposed to temperatures of 650° C. or higher. At these temperatures, some of the layers of the EC device, and in particular the working electrode, may undergo sintering or other undesirable crystallization changes or phase transitions. These changes may affect the operation or efficiency of the EC device.

DETAILED DESCRIPTION OF THE EMBODIMENTS

Various embodiments disclosed herein provide electrochromic nanostructured materials capable of selectively modulating radiation in near-infrared (NIR) and visible spectral regions. The material may include nanostructured doped transition metal oxides with ternary compounds of the type $A_xM_zO_y$. In various embodiment $A_xM_zO_y$ compounds, if it is assumed that z=1, then 0.08≤x≤0.5 (preferably 0.25≤x≤0.35), and 2≤y≤3. In various embodiments, since the nanostructures may be non-uniform as a function of depth, x may represent an average doping content. To operate, the subject material may be fabricated into an electrode that will change optical properties after driven by an applied voltage.

In order to improve the performance of EC window coatings, selective modulation of NIR and visible spectra radiation, and avoidance of degrading effects of UV radiation, may be desired. Various embodiments may provide single-component electrochromic nanostructured materials capable of selectively modulating NIR and visible spectral regions. Further, since certain spectral regions may damage the electrochromic nanostructured material, the various embodiments may incorporate at least one protective material and/or protective layer to prevent such damage.

The various embodiments provide devices and methods for enhancing optical changes in windows using electrochromic nanostructured materials fabricated into an electrode to form an electrochromic device. In various embodiments, the material may undergo a reversible change in optical properties when driven by an applied potential. Based on the applied potential, the electrochromic nanostructured materials may modulate NIR radiation (wavelength of around 780-2500 nm), as well as visible radiation (wavelength of around 400-780 nm). In an example, the device may include a first nanostructured material that modulates radiation in a portion of the NIR spectral region and in the visible spectral region, and a second nanostructured material that modulates radiation in an overlapping portion of the NIR spectral region such that the NIR radiation modulated by the device as a whole is enhanced and expanded relative to that of just the first nanostructured material. In various embodiments, the material may operate in multiple selective modes based on the applied potential.

Further, the various embodiments may include at least one protective material to prevent or reduce damage to an electrochromic nanostructured material that may result from repeated exposure to radiation in the UV spectral region. In an example, a protective material may be used to form at least one barrier layer in the device that is positioned to block UV radiation from reaching the first nanostructured material and electrolyte. In another example, a protective material may be used to form a layer that is positioned to block free electron or hole charge carriers created in the electrolyte due to absorption of UV radiation by the nanostructured electrode material from migrating to that material, while allowing conduction of ions from the electrolyte (i.e., an electron barrier and ion conductor).

In various embodiments, control of individual operating modes for modulating absorption/transmittance of radiation in specific spectral regions may occur at different applied biases. Such control may provide users with the capability to achieve thermal management within buildings and other enclosures (e.g., vehicles, etc.), while still providing shading when desired.

Figure 1A:
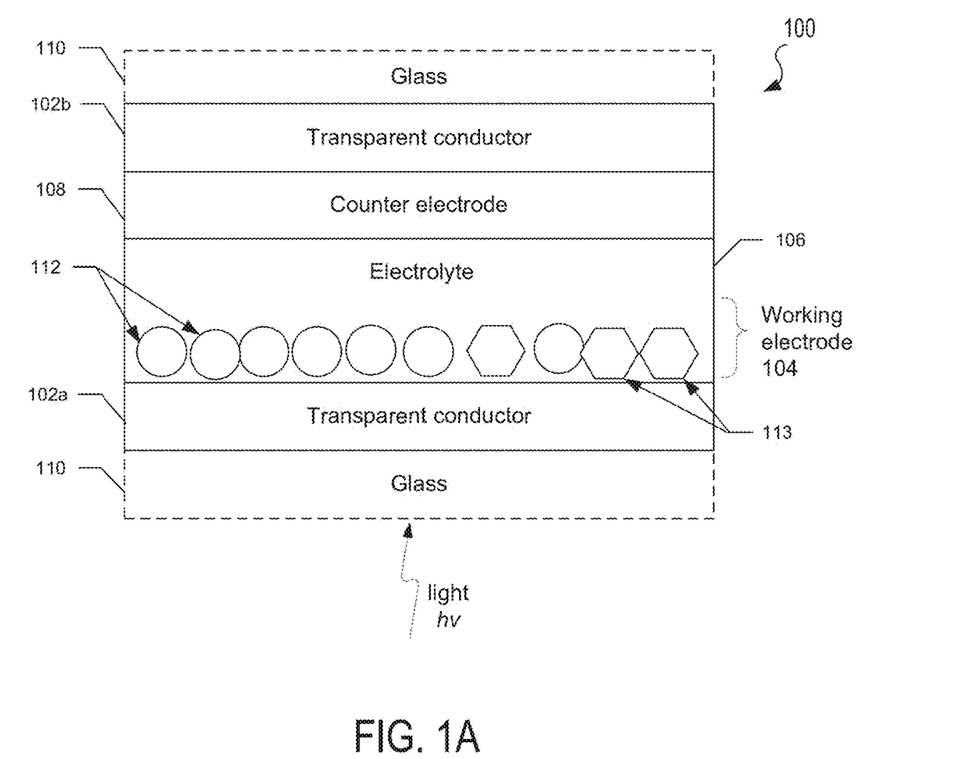
FIGS. 1A-1C are schematic representations of electrochromic devices according to various embodiments.
Figure 1B:
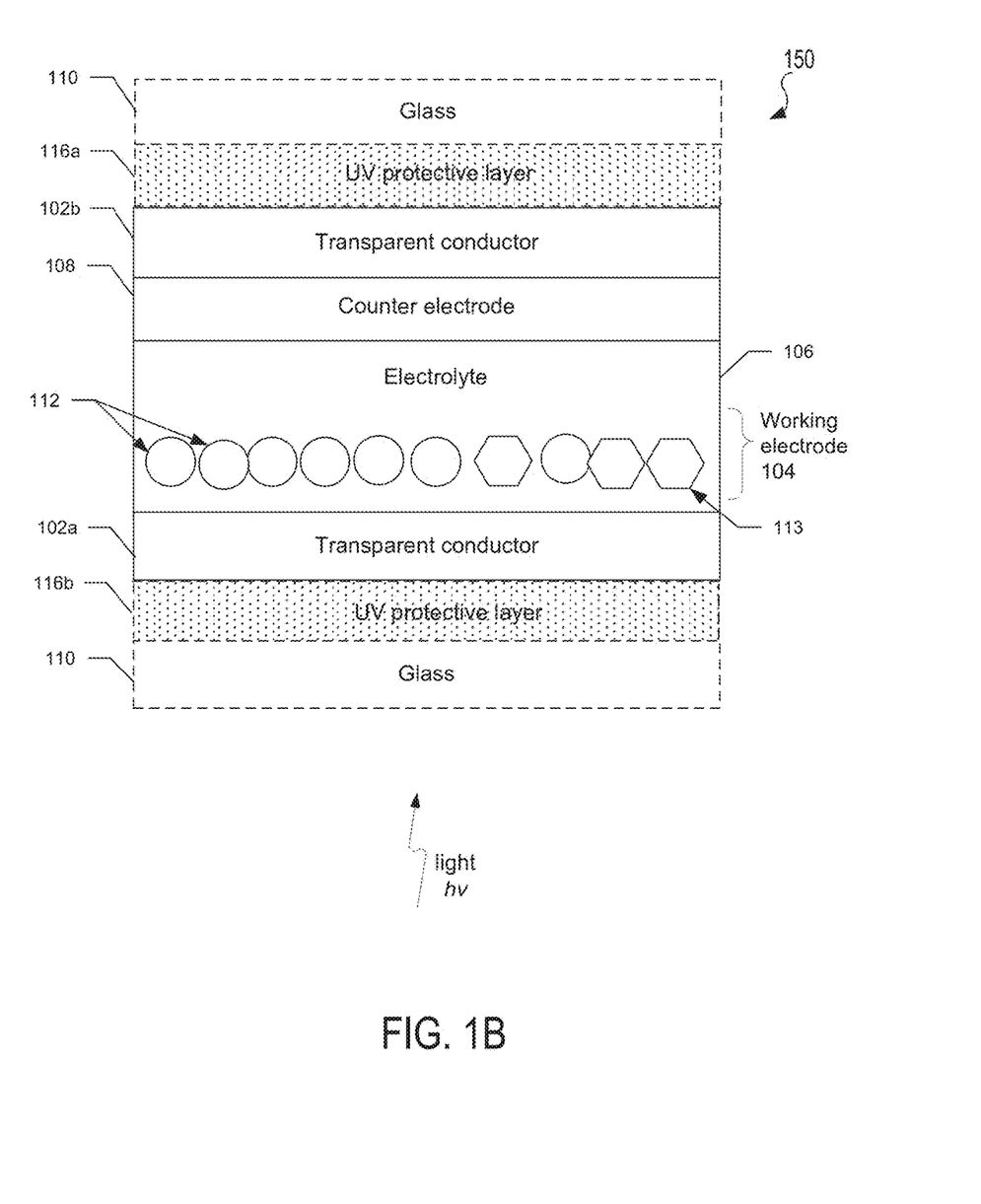
Figure 1C:
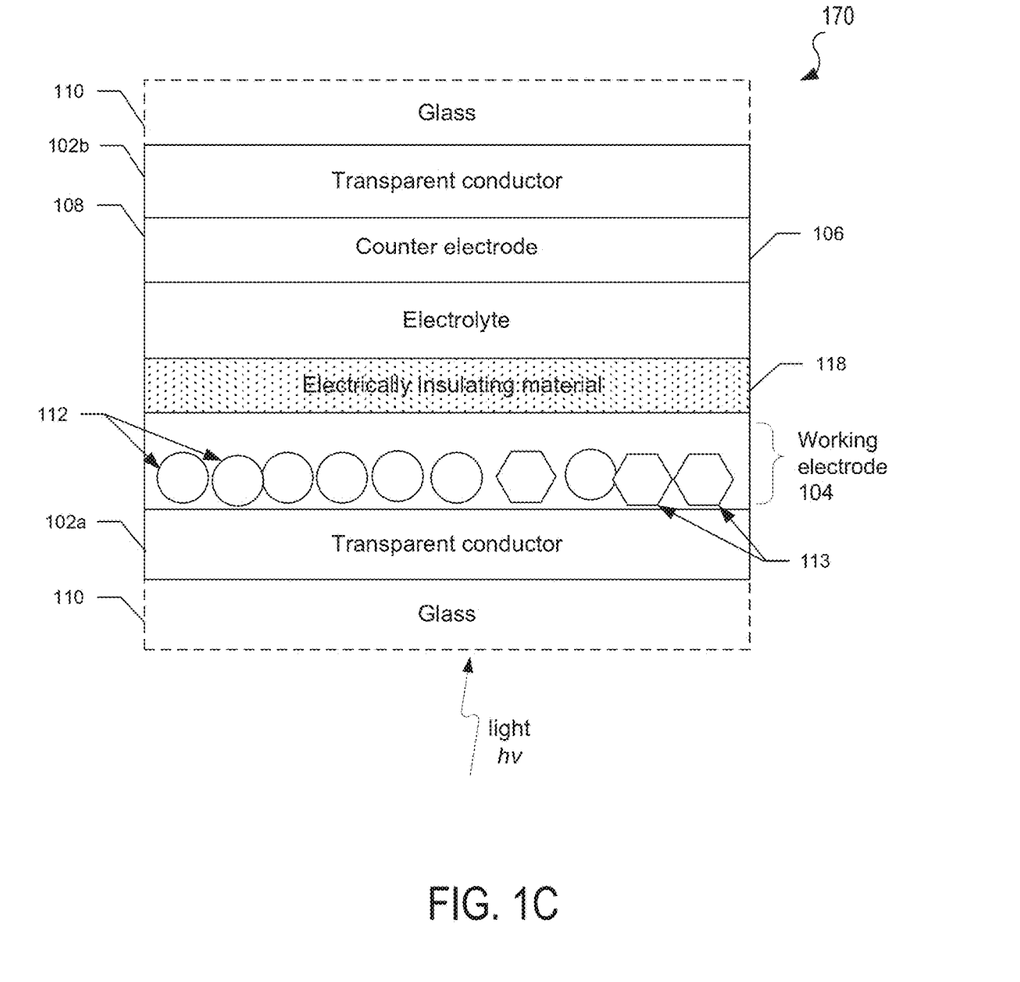

FIGS. 1A-1C illustrate embodiment electrochromic devices. It should be noted that such electrochromic devices may be oriented upside down or sideways from the orientations illustrated in FIGS. 1A-1C. Furthermore, the thickness of the layers and/or size of the components of the devices in FIGS. 1A-1C are not drawn to scale or in actual proportion to one another other, but rather are shown as representations.

In FIG. 1A, an embodiment electrochromic device 100 may include a first transparent conductor layer 102a, a working electrode 104, a solid state electrolyte 106, a counter electrode 108, and a second transparent conductor layer 102b. Some embodiment electrochromic devices may also include one or more optically transparent support layer, such as plastic or glass layer 110 positioned in front of the first transparent conductor layer 102a and/or positioned behind the second transparent conductor layer 102b.

The first and second transparent conductor layers 102a, 102b may be formed from transparent conducting films fabricated using inorganic and/or organic materials. For example, the transparent conductor layers 102a, 102b may include inorganic films of transparent conducting oxide (TCO) materials, such as indium tin oxide (ITO) or fluorine doped tin oxide (FTO). In other examples, organic films in transparent conductor layers 102a, 102b may include graphene and/or various polymers.

In the various embodiments, the working electrode 104 may include nanostructures 112 of a doped transition metal oxide bronze, and optionally nanostructures 113 of a transparent conducting oxide (TCO) composition shown schematically as circles and hexagons for illustration purposes only. As discussed above, the thickness of the layers of the device 100, including and the shape, size and scale of nanostructures is not drawn to scale or in actual proportion to each other, but is represented for clarity. In the various embodiments, nanostructures 112, 113 may be embedded in an optically transparent matrix material or provided as a packed or loose layer of nanostructures exposed to the electrolyte.

In the various embodiments, the doped transition metal oxide bronze of nanostructures 112 may be a ternary composition of the type $A_xM_zO_y$, where M represents a transition metal ion species in at least one transition metal oxide, and A represents at least one dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the nanostructured transition metal oxide bronze may include a plurality of tungsten oxide ($WO_{3-x}$) nanoparticles, where $0 \leq x \leq 0.33$, such as $0 \leq x \leq 0.1$.

In various embodiments, the at least one dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanostructure shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the solid state electrolyte 106 and the nanostructured transition metal oxide bronze of the working electrode 104 as a result of the applied voltage. Specifically, the application of voltage within the particular range may cause the second dopant species to intercalate and deintercalate the transition metal oxide structure. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species.

In various embodiments, nanostructures 113 may optionally be mixed with the doped transition metal oxide bronze nanostructures 112 in the working electrode 104. In the various embodiments, the nanostructures 113 may include at least one TCO composition, which prevents UV radiation from reaching the electrolyte and generating electrons. In an example embodiment, the nanostructures 113 may include an indium tin oxide (ITO) composition, which may be a solid solution of around 60-95 wt % (e.g., 85-90 wt %) indium(III) oxide ($In_2O_3$) and around 5-40 wt % (e.g., 10-15 wt %) tin(IV) oxide ($SnO_2$). In another example embodiment, the nanostructures 113 may include an aluminum-doped zinc oxide (AZO) composition, which may be a solid solution of around 99 wt % zinc oxide (ZnO) and around 2 wt % aluminum(III) oxide ($Al_2O_3$). Additional or alternative TCO compositions that may be used to form nanostructures 113 in the various embodiments include, but are not limited to, indium oxide, zinc oxide and other doped zinc oxides such as gallium-doped zinc oxide and indium-doped zinc oxide.

The TCO composition of nanostructures 113 may be transparent to visible light and, upon application of the first voltage, may modulate absorption of NIR radiation at wavelengths of around 1200-2500 nm, with peak absorbance around 2000 nm (e.g., at a longer peak wavelength than the bronze nanoparticles 112, but with overlapping absorption bands). In particular, application of the first voltage may cause an increase in free electron charge carriers, and therefore cause a surface plasmon resonance effect in at least one TCO composition of nanostructures 113. In an embodiment in which the TCO composition is ITO, the surface plasmon resonance effect may be caused by oscillation of free electrons produced by the replacement of indium ions ($In^{3+}$) with tin ions ($Sn^{4+}$). Similar to the transition metal oxide bronze, such surface plasmon resonance may cause a change in absorption properties of the TCO material. In some embodiments, the change in absorption properties may be an increase in absorbance of NIR radiation at wavelengths that overlaps with that of the nanostructures 112. Therefore, the addition of TCO composition nanostructures 113 to the working electrode 104 may serve to expand the range of NIR radiation absorbed (e.g., at wavelengths of around 780-2500 nm) compared to that of the nanostructures 112 alone (e.g., at wavelengths of around 780-2000 nm), and to enhance absorption of some of that NIR radiation (e.g., at wavelengths of around 1200-2000 nm).

Based on these optical effects, the nanostructure 112 and optional nanostructure 113 of the working electrode may progressively modulate transmittance of NIR and visible radiation as a function of applied voltage by operating in at least three different modes. For example, a first mode may be a highly solar transparent ("bright") mode in which the working electrode 104 is transparent to NIR radiation and visible light radiation. A second mode may be a selective-IR blocking ("cool") mode in which the working electrode 104 is transparent to visible light radiation but absorbs NIR radiation. A third mode may be a visible blocking ("dark") mode in which the working electrode 104 absorbs radiation in the visible spectral region and at least a portion of the NIR spectral region. In an example, application of a first voltage having a negative bias may cause the electrochromic device to operate in the cool mode, blocking transmittance of NIR radiation at wavelengths of around 780-2500 nm. In another example, application of a second negative bias voltage having a higher absolute value than the first voltage may cause the electrochromic device to operate in the dark state, blocking transmittance of visible radiation (e.g., at wavelengths of around 400-780 nm) and NIR radiation at wavelengths of around 780-1200 nm. In another example, application of a third voltage having a positive bias may cause the electrochromic device to operate in the bright state, allowing transmittance of radiation in both the visible and NIR spectral regions. In various embodiments, the applied voltage may be between −5V and 5V, preferably between −2V and 2V. For example, the first voltage may be −0.25V to −0.75V, and the second voltage may be −1V to −2V. In another example, the absorbance of radiation at a wavelength of 800-1500 nm by the electrochromic device may be at least 50% greater than its absorbance of radiation at a wavelength of 450-600 nm.

Alternatively, the nanostructure 112 and optional nanostructure 113 of the working electrode may modulate transmittance of NIR and visible radiation as a function of applied voltage by operating in two different modes. For example, a first mode may be a highly solar transparent ("bright") mode in which the working electrode 104 is transparent to NIR radiation and visible light radiation. A second mode may be a visible blocking ("dark") mode in which the working electrode 104 absorbs radiation in the visible spectral region and at least a portion of the NIR spectral region. In an example, application of a first voltage having a negative bias may cause the electrochromic device to operate in the dark mode, blocking transmittance of visible and NIR radiation at wavelengths of around 780-2500 nm. In another example, application of a second voltage having a positive bias may cause the electrochromic device to operate in the bright mode, allowing transmittance of radiation in both the visible and NIR spectral regions. In various embodiments, the applied voltage may be between −2V and 2V. For example, the first voltage may be −2V, and the second voltage may be 2V.

In various embodiments, the solid state electrolyte 106 may include at least a polymer material and a plasticizer material, such that electrolyte may permeate into crevices between the transition metal oxide bronze nanoparticles 112 (and/or nanoparticles 113 if present). The term "solid state," as used herein with respect to the electrolyte 106, refers to a polymer-gel and/or any other non-liquid material. In some embodiments, the solid state electrolyte 106 may further include a salt containing, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an example embodiment, such salt in the solid state electrolyte 106 may contain a lithium and/or sodium ions. In some embodiments, the solid state electrolyte 106 may initially contain a solvent, such as butanol, which may be evaporated off once the electrochromic device is assembled. In some embodiments, the solid state electrolyte 106 may be around 40-60 wt % plasticizer material, preferably around 50-55 wt % plasticizer material. In an embodiment, the plasticizer material may include at least one of tetraglyme and an alkyl hydroperoxide. In an embodiment, the polymer material of the solid state electrolyte 106 may be polyvinylbutyral (PVB), and the salt may be lithium bis(trifluoromethane). In other embodiments, the solid state electrolyte 106 may include at least one of lithium phosphorus oxynitride (LiPON) and tantalum pentoxide ($Ta_2O_5$).

In some embodiments, the electrolyte 106 may include a sacrificial redox agent (SRA). Suitable classes of SRAs may include, but are not limited to, alcohols, nitrogen heterocycles, alkenes, and functionalized hydrobenzenes. Specific examples of suitable SRAs may include benzyl alcohol, 4-methylbenzyl alcohol, 4-methoxybenzyl alcohol, dimethylbenzyl alcohol (3,5-dimethylbenzyl alcohol, 2,4-dimethylbenzyl alcohol etc.), other substituted benzyl alcohols, indoline, 1,2,3,4-tetrahydrocarbazole, N,N-dimethylaniline, 2,5-dihydroanisole, etc. In various embodiments, the SRA molecules may create an air stable layer that does not require an inert environment to maintain charge.

Polymers that may be part of the electrolyte 106 may include, but are not limited to, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), etc. Plasticizers that may be part of the polymer electrolyte formulation include, but are not limited to, glymes (tetraglyme, triglyme, diglyme etc.), propylene carbonate, ethylene carbonate, ionic liquids (1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl)imide, etc.), N,N-dimethylacetamide, and mixtures thereof.

In some embodiments, the electrolyte 106 may include, by weight, 10-30% polymer, 40-80% plasticizer, 5-25% lithium salt, and 0.5-10% SRA.

The counter electrode 108 of the various embodiments should be capable of storing enough charge to sufficiently balance the charge needed to cause visible tinting to the nanostructured transition metal oxide bronze in the working electrode 104. In various embodiments, the counter electrode 108 may be formed as a conventional, single component film, a nanostructured film, or a nanocomposite layer.

In some embodiments, the counter electrode 108 may be formed from at least one passive material that is optically transparent to both visible and NIR radiation during the applied biases. Examples of such passive counter electrode materials may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, and/or $V_2O_5$. In other embodiments the counter electrode 108 may be formed from at least one complementary material, which may be transparent to NIR radiation but which may be oxidized in response to application of a bias, thereby causing absorption of visible light radiation. Examples of such complementary counter electrode materials may include $Cr_2O_3$, $MnO_2$, $FeO_2$, $CoO_2$, $NiO_2$, $RhO_2$, or $IrO_2$. The counter electrode materials may include a mixture of one or more passive materials and/or one or more complementary materials described above.

Without being bound to any particular theory, it is believed that the application of a first voltage in the various embodiments may cause the interstitial dopant species (e.g., cesium) in the crystal structure of the transition metal oxide bronze to have a greater amount of free carrier electrons and/or to cause the interstitial dopant species (e.g., lithium ions from the electrolyte) to perform non-faradaic capacitive or pseudo-capacitive charge transfer on the surface of the nanostructures 112, which may cause the surface plasmon resonance effect to increase the absorption of NIR radiation. In this manner, the absorption properties of the transition metal oxide bronze characteristics may change (i.e., increased absorption of NIR radiation) upon application of the first voltage. Further, application of a second voltage having a higher absolute value than the first voltage in the various embodiments may cause faradaic intercalation of an intercalation dopant species (e.g., lithium ions) from the electrolyte into the transition metal oxide nanostructures. It is believed that the interaction of this dopant species provides interstitial dopant atoms in the lattice which creates a polaron effect. In this manner, the lattice structure of transition metal oxide nanoparticles may experience a polaron-type shift, thereby altering its absorption characteristics (i.e., shift to visible radiation) to block both visible and near infrared radiation.

In some embodiments, in response to radiation of certain spectral regions, such as UV (e.g., at wavelengths of around 10-400 nm) may cause excitons to be generated in the polymer material of the solid state electrolyte 106. The UV radiation may also excite electrons in the doped transition metal oxide bronze to move into the conduction band, leaving holes in the valence band. The generated excitons in the polymer material may dissociate to free carriers, the electrons of which may be attracted to the holes in the valence band in the doped transition metal oxide bronze (e.g., cesium-doped tungsten trioxide ($Cs_xWO_3$)) of nanoparticles 112. Since electrochemical reduction of various transition metal oxide bronzes by such free electron charge carriers may degrade their performance (i.e., from unwanted coloration of the transition metal oxide bronze), embodiment devices may include one or more layer of a protective material to prevent UV radiation from reaching the solid state electrolyte 106, in addition to or instead of nanostructures 113 mixed into the working electrode.

FIG. 1B illustrates an embodiment electrochromic device 150 that addresses degradation of the doped transition metal oxide bronze nanostructures 112. Similar to device 100 shown in FIG. 1A, device 150 may include a first transparent conductor layer 102a, a working electrode 104, a solid state electrolyte 106, a counter electrode 108, a second transparent conductor layer 102b, and one or more optically transparent support layers 110. In addition, device 150 may include one or more protective layers 116a, 116b made of a material that absorbs UV radiation. In an example embodiment, the UV protective layer 116a may be placed between the transparent conductor 102a and the glass 110 on one side of the device 150, while the UV protective layer 116b may be placed between the transparent conductor 102b and the glass on the other side of the device 150. Alternatively, the device 150 may include a first protective layer 116a positioned in front of the first transparent conductor layer 102a. For example, the first protective layer 116a may be positioned between the first transparent conductor layer 102a and, if present, the optically transparent support layer 110. Alternatively, if present, the first protective layer 116 may be positioned in front of the optically transparent support layer 110 (i.e., on the side of the conductor layer 102a or support layer 110 opposite from the working electrode 104). In another example embodiment, the device 150 may additionally or alternatively provide a second protective layer 116b that is positioned between the first transparent conductor layer 102a and the working electrode 104.

The UV radiation absorbing material of the one or more protective layers 116a, 116b of the various embodiments may be any of a number of barrier films. For example, the one or more protective layer 116a may be a thin film of at least one TCO material, which may include a same as or different from TCO compositions in the nanostructures 113. In an example embodiment, a protective layer 116a of the device 150 may be an ITO thin film, and therefore capable of absorbing UV radiation by band-to-band absorption (i.e., absorption of a UV photon providing enough energy to excite an electron from the valence band to the conduction band). In another example embodiment, the device may include the TCO nanostructures 113 made of ITO, as well as a protective layer 116a composed of an ITO thin film. Alternatively, the TCO nanostructures 113 may form a separate thin film layer 116b disposed between the transition metal oxide bronze nanoparticles 112 and the transparent conductor 102a. In some embodiments, the UV radiation absorbing materials of protective layers 116a, 116b may include organic or inorganic laminates.

In another embodiment, at least one UV protective layer, such as protective layer 116a in FIG. 1B, may be a UV radiation reflector made of a high index transparent metal oxide. Since birds can see radiation in the UV range, a UV reflector may be implemented in embodiments positioned as outside windows in order to prevent birds from hitting the windows. In some other embodiments, UV radiation absorbing organic molecules and/or inorganic UV radiation absorbing nanoparticles (e.g., zinc oxide, indium oxide, ITO, etc.) may be incorporated within the electrolyte 106 material.

FIG. 1C illustrates another embodiment electrochromic device 170 that addresses degradation of the doped transition metal oxide bronze nanostructures 112 by controlling the effects of the electron charge carriers generated in the electrolyte from exposure to UV radiation. Similar to devices 100 and 150 discussed above with respect to FIGS. 1A and 1B respectively, device 170 may include a first transparent conductor layer 102a, a working electrode 104, a solid state electrolyte 106, a counter electrode 108, a second transparent conductor layer 102b, and one or more optically transparent support layer 110. In addition, device 170 may include a protective layer 118 positioned between the working electrode 104 and the electrolyte 106. The protective layer 118 may be composed of one or more ionically conductive and electrically insulating material.

As discussed above, without being bound to any particular theory, it is believed that the migration of intercalation ions between the electrolyte 106 and the working electrode 104 is responsible for at least some of the device's capability to modulate spectral absorption. Therefore, in order to maintain operability of the device, the electrically insulating material used to form the protective layer 118 should also be ionically conductive. That is, the material of the protective layer 118 may prevent or reduce free electrons in the solid state electrolyte layer 106 from reducing the transition oxide bronze of nanoparticles 112, while allowing the diffusion of ions of an intercalation dopant species (e.g., Na, Li, etc.) between the electrolyte 106 and working electrode 104. In an example embodiment, the electrically insulating material that makes up the protective layer 118 may be tantalum oxide, such as tantalum pentoxide ($Ta_2O_5$), which blocks migration of electrons from the electrolyte 106 while allowing diffusion of the intercalation dopant species ions (e.g., lithium ions) from the electrolyte 106. In this manner, degradation of the transition metal oxide bronze is reduced or prevented by controlling the effect of the absorbed UV radiation in addition to or instead of instead of blocking its absorption. Other example materials that may be used to form the protective layer 118 in addition to or instead of tantalum pentoxide may include, without limitation, strontium titanate ($SrTiO_3$), zirconium dioxide ($ZrO_2$), indium oxide, zinc oxide, tantalum carbide, niobium oxide, and various other dielectric ceramics having similar electrical and/or crystalline properties to tantalum pentoxide.

In an alternative embodiment, instead of or in addition to the protective layer 118, the nanostructures 112 may each be encapsulated in a shell containing an electrically insulating and ionically conductive material, which may be the same as or different from the material of the protective layer 118 (e.g., tantalum oxide, strontium titanate, zinc oxide, indium oxide, zirconium oxide, tantalum carbide, or niobium oxide).

In an example embodiment, each nanostructure 112 may have a core of cubic or hexagonal unit cell lattice structure tungsten bronze, surrounded by a shell of tantalum pentoxide.

In some embodiments, the electrolyte 106 may include a polymer that reduces damage to the device due to UV radiation. The polymer may be any of a number of polymers that are stable upon absorption of UV radiation (e.g., no creation of proton/electron pairs). Examples of such polymers may include, but are not limited to, fluorinated polymers without hydroxyl (—OH) groups (e.g., polyvinylidene difluoride (PVDF)).

In another embodiment, a positive bias may be applied to the counter electrode 108 to draw UV radiation generated electrons from the electrolyte 106 to the counter electrode 108 in order to reduce or prevent electrons from the electrolyte 106 from moving to the working electrode 104 to avoid the free electron-caused coloration of the doped transition metal oxide bronze in the working electrode 104.

In another embodiment, a device may include more than one of, such as any two of, any three of, or all four of: (i) a protective layer of electrically insulating material (e.g., protective layer 118 or protective material shells around the bronze nanoparticles), (ii) one or more protective layer of UV radiation absorbing material (e.g., protective layer(s) 116a and/or 116b in FIG. 1B and/or UV radiation absorbing organic molecules and/or inorganic UV radiation absorbing nanoparticles incorporated within the electrolyte 106 material), (iii) electrolyte polymer that is stable upon absorption of UV radiation, and/or (iv) application of positive bias to the counter electrode 108. In various embodiments, the nanostructures 113 may be included in or omitted from electrochromic devices 150, 170.

In another embodiment, the protective layer(s) 116a and/or 116b may comprise a stack of metal oxide layers. Alternatively, the stack may comprise a separate component that is provided instead of or in addition to the layer(s) 116a and/or 116b. The stack may provide improvement in the reflected color of the electrochromic device. Prior art devices generally have a reddish/purplish color when viewed in reflection. The stack may comprise index-matched layers between the glass and transparent conductive oxide layer to avoid the reddish/purplish reflected color. As noted above, the index-matched layer can serve as the UV absorber or be used in addition to another UV absorber. The stack may comprise a zinc oxide based layer (e.g., ZnO or AZO) beneath an indium oxide based layer (e.g., indium oxide or ITO).

Compared to nanocomposite electrochromic films, the various embodiments may involve similar production by utilizing a single nanostructured material in the working electrode to achieve the desired spectral absorption control in both NIR and visible regions, and another nanostructured material to enhance and expand such control in the NIR region. Further, the various embodiments may provide one or more additional layer(s) of a protective material to minimize degradation of the single nanostructured material.

In some embodiments, the working electrode and/or the counter electrode may additionally include at least one material, such as an amorphous nanostructured material, that enhances spectral absorption in the lower wavelength range of the visible region. In some embodiments, the at least one amorphous nanostructured material may be at least one nanostructured amorphous transition metal oxide.

In particular, the amorphous nanostructured materials may provide color balancing to the visible light absorption that may occur due to the polaron-type shift in the spectral absorption of the doped-transition metal oxide bronze. As discussed above, upon application of the second voltage having a higher absolute value, the transition metal oxide bronze may block (i.e., absorb) radiation in the visible range. In various embodiments, the absorbed visible radiation may have wavelengths in the upper visible wavelength range (e.g., 500-700 nm), which may cause the darkened layer to appear blue/violet corresponding to the un-absorbed lower visible wavelength range (e.g., around 400-500 nm). In various embodiments, upon application of the second voltage, the at least one nanostructured amorphous transition metal oxide may absorb complementary visible radiation in the lower visible wavelength range (e.g., 400-500 nm), thereby providing a more even and complete darkening across the visible spectrum with application of the second voltage. That is, use of the amorphous nanostructured material may cause the darkened layer to appear black.

In some embodiments, at least one nanostructured amorphous transition metal oxide may be included in the working electrode 104 in addition to the doped-transition metal oxide bronze nanostructures 112 and the optional TCO nanostructures 113. An example of such material in the working electrode 104 may be, but is not limited to, nanostructured amorphous niobium oxide, such as niobium(II) monoxide (NbO) or other niobium oxide materials (e.g., $NbO_x$). In some embodiments, the counter electrode 108 may include, as a complementary material, at least one nanostructured amorphous transition metal oxide. That is, in addition to optically passive materials, the counter electrode 108 may include at least one material for color balancing (i.e., complementing) the visible radiation absorbed in the working electrode (i.e., by the transition metal oxide bronze. An example of such material in the counter electrode 108 may be, but is not limited to, nanostructured amorphous nickel oxide, such as nickel(II) oxide (NiO) or other nickel oxide materials (e.g., $NiO_x$).

In the various embodiments, nanostructures that form the working and/or counter electrode, including the at least one amorphous nanostructured material, may be mixed together in a single layer. An example of a mixed layer is shown in FIG. 1A with respect to transition metal oxide bronze nanostructures 112 and TCO nanostructures 113. Alternatively, nanostructures that form the working and/or counter electrode, including the at least one amorphous nanostructured material, may be separately layered according to composition. For example, a working electrode may include a layer of amorphous $NbO_x$ nanostructures, a layer of transition metal oxide bronze nanostructures, and a layer of ITO nanostructures, in any of a number of orders.

The nanostructured transition metal oxide bronzes that may be part of the working electrode 104 in various embodiment devices can be formed using any of a number of low cost solution process methodologies. For example, solutions of $Nb:TiO_2$ and $Cs_xWO_3$ may be synthesized using colloidal techniques. Compared to other synthetic methodologies, colloidal synthesis may offer a large amount of control over the nanostructure size, shape, and composition of the nanostructured transition metal oxide bronze. After deposition, a nanostructured transition metal oxide bronze material in the working electrode 104 may be subjected to a thermal post treatment in air to remove and cap ligands on the surface of the nanostructures.

In various embodiments, nanostructured amorphous transition metal oxide materials may be formed at room temperature from an emulsion and an ethoxide precursor. For example, procedures used to synthesize tantalum oxide nanoparticles that are described in "Large-scale synthesis of bioinert tantalum oxide nanoparticles for X-ray computed tomography imaging and bimodal image-guided sentinel lymph node mapping" by MH Oh et al. (J Am Chem Soc. 2011 Apr. 13; 133(14):5508-15), incorporated by reference herein, may be similarly used to synthesize amorphous transition metal oxide nanoparticles. For example, an overall synthetic process of creating the nanoparticle, as described in Oh et al., may adopted from the microemulsion synthesis of silica nanoparticles. In such process, a mixture of cyclohexane, ethanol, surfactant, and a catalysis for the sol-gel reaction may be emulsified. The ethoxide precursor may be added to the emulsion, and uniform nanoparticles may be formed by a controlled-sol gel reaction in the reverse micelles at room temperature within around 5 minutes. The sol-gel reaction may be catalyzed, for example, by NaOH.

In some embodiments, the nanostructured amorphous transition metal oxide may be sintered at a temperature of at least 400° C. for at least 30 minutes, such as 400 to 600° C. for 30 to 120 minutes to form a porous web. In an example embodiment, the porous web may be included in a working electrode 104, with the tungsten bronze nanoparticles and ITO nanoparticles incorporated in/on the web. Alternatively, the sintering step may be omitted and the nanostructured amorphous transition metal oxide may remain in the device in the form of nanoparticles having amorphous structure. In this embodiment, the device containing the nanostructured amorphous transition metal oxide may include or may omit the protective layer(s) 116a, 116b, and 118, the UV stable electrolyte polymer, and the application of positive bias to the counter electrode.

Electrochromic responses of prepared nanostructured transition metal oxide bronze materials (e.g., $Cs_xWO_3$, $Nb:TiO_2$, etc.) may be demonstrated by spectroelectrochemical measurements.

In various embodiments, the shape, size, and doping levels of nanostructured transition metal oxide bronzes may be tuned to further contribute to the spectral response by the device. For instance, the use of rod versus spherical nanostructures 112 may provide a wider level of porosity, which may enhance the switching kinetics. Further, a different range of dynamic plasmonic control may occur for nanostructures with multiple facets, such as at least 20 facets.

Various embodiments may also involve alternation of the nanostructures 112 that form the working electrode 104. For example, the nanostructures may be nanoparticles of various shapes, sizes and/or other characteristics that may influence the absorption of NIR and/or visible light radiation. In some embodiments, the nanostructures 112 may be isohedrons that have multiple facets, preferably at least 20 facets.

In some embodiments, the transition metal oxide bronze nanostructures 112 may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 104. For example, the working electrode 104 may include both cubic and hexagonal cesium doped tungsten oxide bronze nanoparticles. In alternative embodiments, the working electrode 104 may include either cubic or hexagonal cesium doped tungsten oxide nanoparticles. For example, the working electrode 104 may include cubic cesium-doped tungsten oxide (e.g. $Cs_1W_2O_{6\pm x}$) nanoparticles and amorphous niobium oxide nanoparticles or hexagonal cesium-doped tungsten oxide (e.g. $Cs_{0.29}W_1O_3$) nanoparticles without niobium oxide. In alternative embodiments, the working electrode 104 may include undoped tungsten oxide (e.g. $WO_{3-x}$) nanoparticles where $0 \leq X \leq 0.1$.

For example, upon application of the first (i.e., lower absolute value) voltage described above, the hexagonal bronze nanostructures 112 may block NIR radiation having wavelengths in the range of around 800-1700 nm, with the peak absorption at the mid-NIR wavelength of around 1100 nm. The cubic bronze nanostructures 112 may block NIR radiation having wavelengths in the close-NIR range with the peak absorption of around 890 nm. The indium oxide based (including ITO) and/or zinc oxide based (including AZO) nanostructures 113 may be included in the working electrode 104 to block the higher wavelength IR radiation upon application of the first voltage. Thus, the cubic bronze and hexagonal bronze nanostructures may block respective close and mid-NIR radiation (e.g., using the Plasmon effect), while the nanostructures 113 may block the higher wavelength IR radiation.

Upon application of the second (i.e., higher absolute value) voltage described above, the cubic bronze nanostructures 112 may block visible and NIR radiation having wavelengths in the range of around 500-1500 nm, with the peak absorption at the close-NIR wavelength of around 890 nm (e.g., using the polaron effect). Optionally, the amorphous niobium oxide may also be added to the working electrode 104 to block the short wavelength visible radiation (e.g., 400 to 500 nm wavelength).

The cubic bronze nanostructures block visible radiation via the polaron effect at a lower applied voltage than the hexagonal bronze nanostructures. Thus, the second voltage may have an absolute value which is below the value at which the hexagonal bronze nanostructures block visible radiation via the polaron effect such that these nanostructures do not contribute to blocking of visible radiation. Alternatively, the second voltage may have an absolute value which is above the value at which the hexagonal bronze nanostructures block visible radiation via the polaron effect such that these nanostructures also contribute to blocking of visible radiation.

Embodiment nanoparticles that form the working electrode 104 may be around 4-6 nm in diameter, and may include 40 to 70 wt %, such as around 50 wt % cubic tungsten bronze nanostructures, 15 to 35 wt %, such as around 25 wt % hexagonal tungsten bronze nanostructures, and optionally 15 to 35 wt %, such as around 25 wt % ITO nanostructures. In some embodiments, in order to achieve color balancing as described above, the nanoparticles that form the working electrode 104 may optionally include around 5-10 wt % amorphous $NbO_x$ nanostructures in place of cubic tungsten bronze nanostructures. In this embodiment, the device containing two types of bronze nanoparticles may include or may omit the protective layer(s) 116a, 116b, and 118, the UV stable electrolyte polymer, the application of positive bias to the counter electrode, and the amorphous niobium oxide.

In summary, the working electrode 104 may include one or more of the following components:
(a) metal oxide bronze nanostructures 112 having (i) a cubic, (ii) hexagonal, or (iii) a combination of cubic and hexagonal unit cell lattice structure;
(b) protective (i) indium oxide based (including ITO) and/or zinc oxide based (including AZO) nanostructures 113;
(c) amorphous niobium oxide nanoparticles and/or web; and/or
(d) additional nanostructures selected from undoped tungsten oxide, molybdenum oxide, titanium oxide, and/or vanadium oxide.

The counter electrode 108 may include one or more of the following components:
(a) passive electrode material selected from cerium(IV) oxide ($CeO_2$), titanium dioxide ($TiO_2$), cerium(III) vanadate ($CeVO_2$), indium(III) oxide ($In_2O_3$), tin-doped indium oxide, tin(II) oxide ($SnO_2$), manganese-doped tin oxide, antimony-doped tin oxide, zinc oxide (ZnO), aluminum-doped zinc oxide (AZO), iron(III) oxide ($Fe_2O_3$), and vanadium(V) oxide ($V_2O_5$);
(b) an active electrode material selected from chromium (III) oxide ($Cr_2O_3$), manganese dioxide ($MnO_2$), iron (II) oxide (FeO), cobalt oxide (CoO), nickel(II) oxide (NiO), rhodium(IV) oxide ($RhO_2$), and iridium(IV) oxide ($IrO_2$);
(c) amorphous nickel oxide nanoparticles and/or web; and/or
(d) conductivity enhancer nanoparticles selected from indium oxide, ITO, and zinc oxide.

While the various embodiments are described with respect to electrochromic windows, the embodiment methods, systems, and devices may also be used in materials for other types of smart windows. Such smart windows may include, but are not limited to, polymer-dispersed liquid crystals (PLDD), liquid crystal displays (LCDs), thermochromics, etc.

Robust Post-Tempering Electrodes

As discussed above, as part of the electrochromic device manufacturing process one or more layers of the device, including the crystalline nanostructure material of the working electrode 104, may be heat tempered in an oven or furnace at temperatures ranging from 400 to 650° C. The heat tempering may last for 30-120 minutes, after which the layers may be quenched or cooled. For example, quenching may include cooling the layers to temperatures under 100° C. using liquid or gas (e.g. water or air quenching) for periods on the order of seconds (e.g. 5-15 seconds). In an example embodiment, the working electrode 104 may include tungsten bronze nanoparticles (e.g. cesium doped tungsten oxide (e.g. $CsWO_{3-x}$) cubic nanoparticles and/or doped or undoped tungsten oxide (e.g. $WO_{3-x}$) hexagonal nanoparticles, in which X may be zero) and optionally amorphous niobium oxide ($NbO_x$) nanoparticles, while the counter electrode 108 may include cerium oxide nanoparticles and indium oxide nanoparticles. The electrochromic properties of the device should remain the same or substantially the same after it has gone through the tempering process. However, during the tempering and heat quench process, sintering may occur in the working electrode, which may cause the nanoparticles to fuse, change its crystal structure or form new crystal structures, or undergo undesirable phase transitions. These changes to the nanoparticles may negatively affect the operation of the electrochromic device.

Figure 2A:
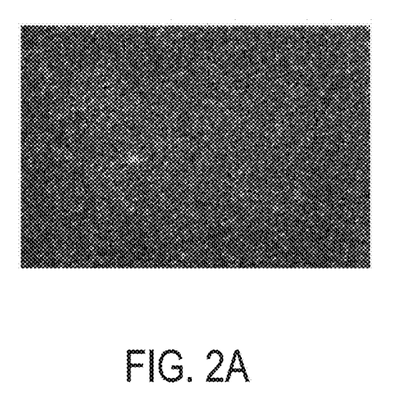
FIGS. 2A-2D are SEM images of crystalline nanostructures that may be used in working electrodes of an electrochromic device before and after tempering.
Figure 2B:
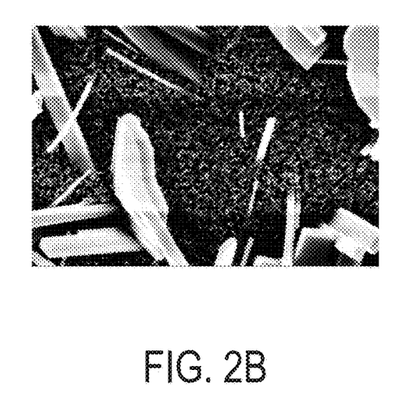

For example, FIG. 2A shows a scanning electron microscope (SEM) image of a sample of cubic cesium-doped tungsten oxide nanoparticles (specifically in FIG. 2A, $Cs_{0.9}W_3O_9$) that may be used in the working electrode 104 before tempering while FIG. 2B shows an SEM image of the same sample after tempering at 650° C. After tempering, fusing of the nanoparticles and large crystal growth is clearly seen in the cubic cesium tungsten oxide sample in addition to the pre-existing nanoparticles. The new crystal growth seen in FIG. 2B may impede functioning of the sample within the working electrode 104 of an electrochromic device.

Figure 2C:
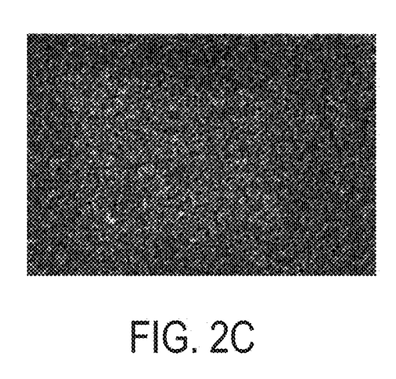
Figure 2D:
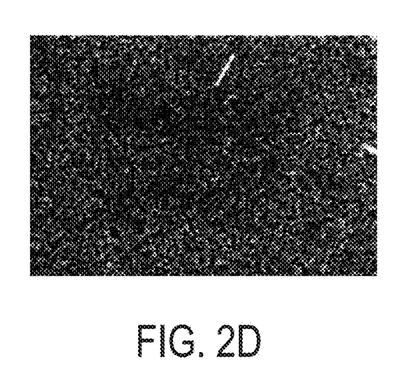

Similarly, FIG. 2C shows a SEM image of a sample of hexagonal cesium-doped tungsten oxide nanoparticles (specifically in FIG. 2C, $Cs_{0.2}WO_3$) that may be used in the working electrode 104 before tempering while FIG. 2D shows an SEM image of the same sample after tempering at 650° C. After tempering, fusing of the nanoparticles and new crystal growth is seen in the hexagonal cesium tungsten oxide sample in addition to the pre-existing nanoparticles. The new crystal growth seen in FIG. 2D may impede functioning of the sample within the working electrode 104 of an electrochromic device.

Figure 3A:
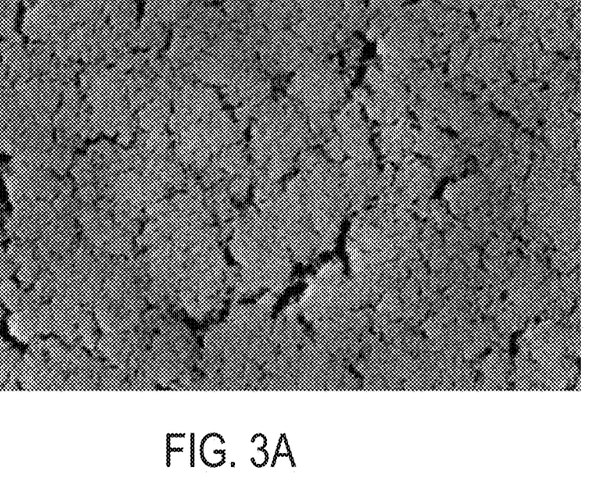
FIGS. 3A-3B are SEM images of crystalline nanostructures that may be used in counter electrodes of an electrochromic device before and after tempering.
Figure 3B:
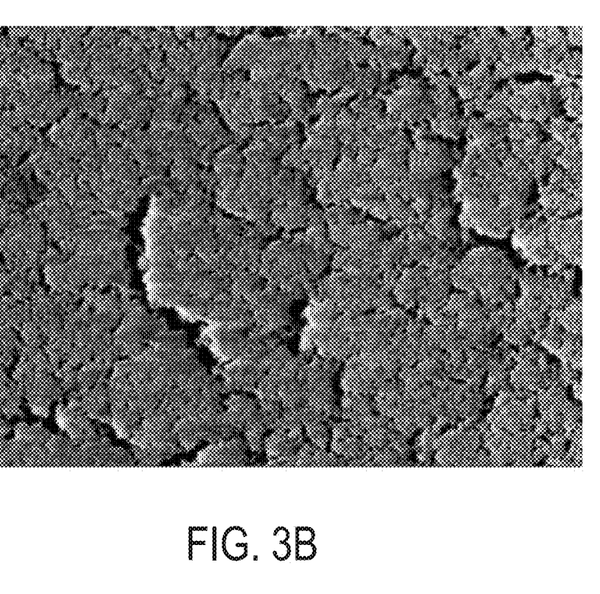
Figure 3C:
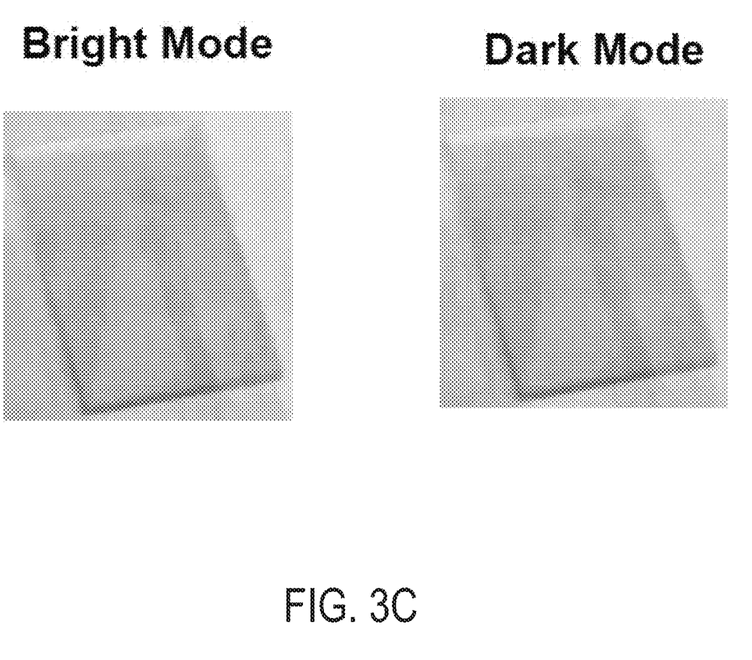
FIG. 3C are images of a counter electrode in bright and dark modes after undergoing tempering.

In contrast, FIGS. 3A and 3B show SEM images of a sample of ceria thin film ($CeO_2$) that may be used in the counter electrode 108 of an electrochromic device before heat tempering (FIG. 3A) and after heat tempering at 650° C. (FIG. 3B). As can be seen, the ceria thin film remains relatively unchanged after the tempering process. FIG. 3C shows pictures of ceria thin film after heat tempering in both bright and dark mode. As can be seen, the heat tempering does not lead to substantial changes in the operation of the ceria thin film as a counter electrode in an electrochromic device.

Figure 3D:
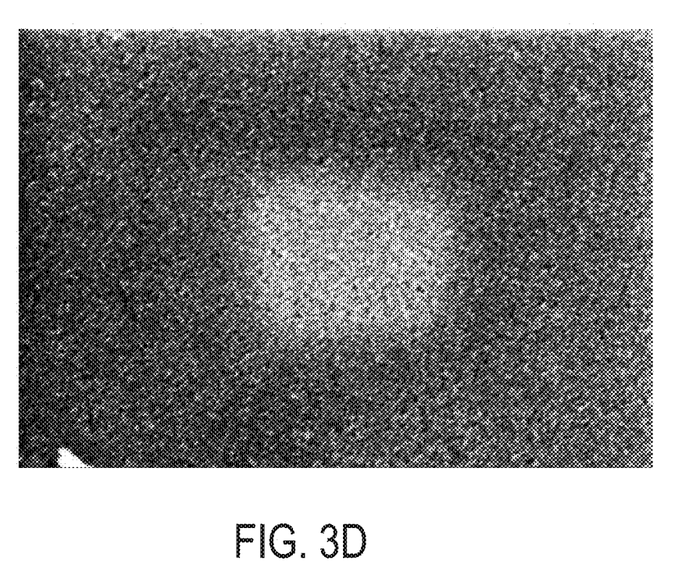
FIGS. 3D-3E are SEM images of alternative crystalline nanostructures that may be used in counter electrodes of an electrochromic device before and after tempering.
Figure 3E:
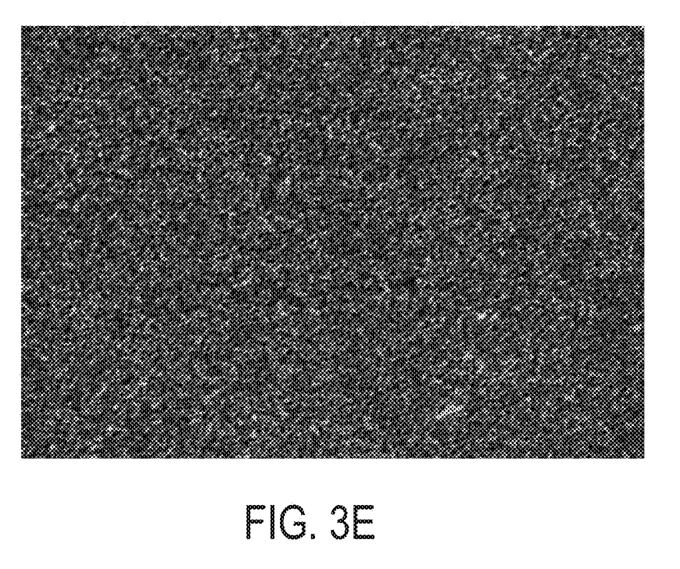

Similarly, FIGS. 3D and 3E show SEM images of a sample of ITO thin film that may be used in the counter electrode 108 of an electrochromic device before heat tempering (FIG. 3D) and after heat tempering at 650° C. (FIG. 3E). As can be seen, the ITO thin film remains relatively unchanged after the tempering process. Thus for some compositions of the counter electrode 108, for example cerium oxide nanoparticles and/or indium oxide nanoparticles, no additional dopant or other materials are needed to protect the counter electrode during the tempering process.

Various embodiments described herein provide for the incorporation of various structures into nanocrystal structures, such as working electrodes in an electrochromic device, which may suppress undesirable nanoparticle crystallization, sintering, or phase transitions during the heat tempering process, or to promote desirable crystallization or phase transitions. The structures may be compatible with a variety of metal oxide nanocrystals and amorphous metal oxide nanoparticles such as, but not limited to, $WO_3$, $CS_xWO_3$, $NbO_x$, $TiO_2$, $MoO_3$, $NiO_2$, and $V_2O_5$.

Figure 4A:
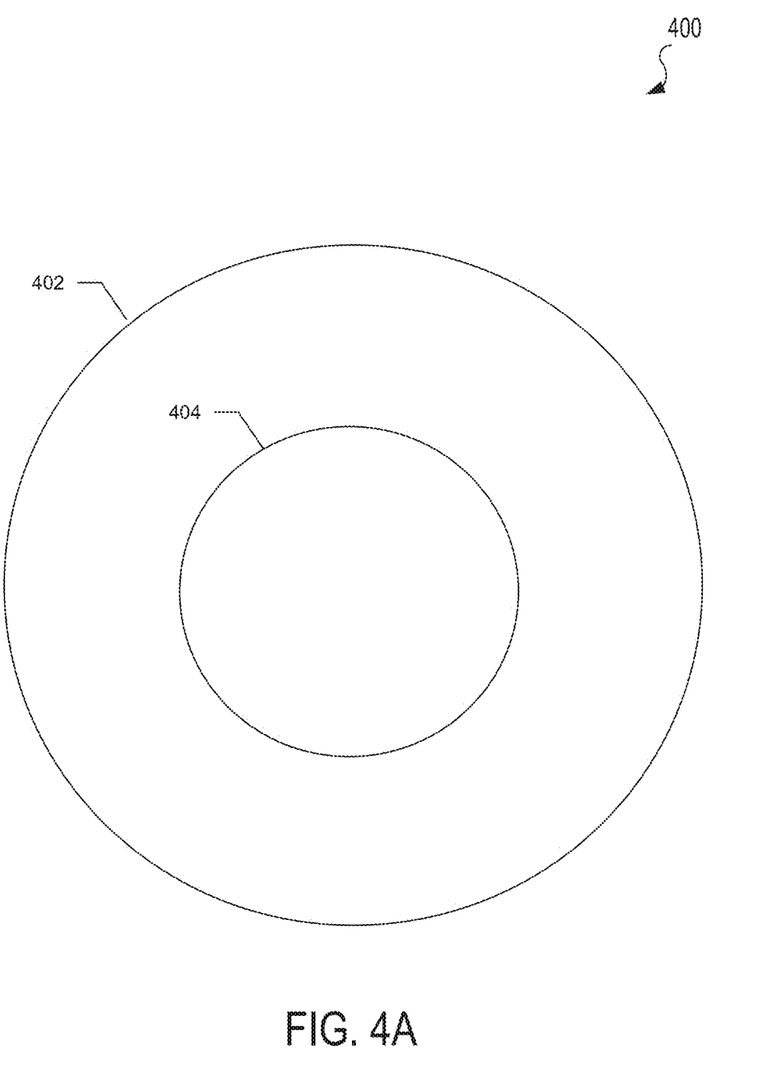
FIGS. 4A-4B are diagrams of high temperature stable materials surrounding nanoparticles according to various embodiments.

In some embodiments, sintering may be suppressed by the use of core-shell nanoparticles in which the shell material is a high temperature stable material (i.e., stable at higher temperatures than the core material). A high temperature stable material may be a material that does not substantially crystallize and keeps the core material from fusing at temperatures ranging from 100° C. to 700° C. An example of a core-shell nanoparticle 300 is shown in FIG. 4A. The core-shell nanoparticle 400 may be implemented in electrodes of the electrodes device, for example the working electrode 104. The core-shell nanoparticles 400 may be arranged, for example, in row configurations within the working electrode 104 so that ions in the electrolyte 106 may diffuse into the working electrode 104.

The shell material 402 of the core-shell nanoparticle 400 may be, for example, tantalum oxide ($Ta_2O_5$), or any other suitable high temperature stable material (e.g. a metal oxide which is stable up to 700° C.) that reduces or prevents core fusing with adjacent core-shell particles under tempering conditions. Even if the shell material 402 undergoes some sintering with other nanoparticle shells during the tempering process, the underlying core material 404 remains unchanged after tempering because it is protected by the shell material 402. The shell material 402 may be composed of any metal, metal oxide, or other material that allows diffusion of ions (e.g. lithium or other alkali or alkali earth ions) between the core material 404 and the electrolyte 106. The shell material 402 may also serve as an electron blocker (i.e. a low electron mobility layer). The shell material 402 may also serve as a coating for UV protection (e.g. also serve as protective layer 118).

The core material 404 may be any type of electrochemically active material, for example the materials discussed in relation to the composition of the working electrode 104. For example, the core material 404 may include, among other things, cesium-doped tungsten oxide ($CsWO_{3-x}$) cubic crystalline structure nanoparticles, undoped hexagonal tungsten oxide ($WO_{3-x}$) nanoparticles, doped transition metal oxide bronze structures, and/or amorphous niobium oxide ($NbO_x$) nanoparticles.

In an alternative embodiment, the tempering may promote a material phase change may be favorable for device performance. For example, an electrode material (e.g., nanoparticles or matrix) may be deposited on the substrate in a first phase which may or may not have adequate electrochromic properties, and after exposure to tempering conditions it transitions to a second phase that has better electrochromic properties than the first phase of the material. In some embodiments, the electrochromic device may include amorphous niobium oxide ($NbO_x$), which may become crystalline niobium oxide ($Nb_2O_5$) during heat tempering and has a blue tint.

Figure 4B:
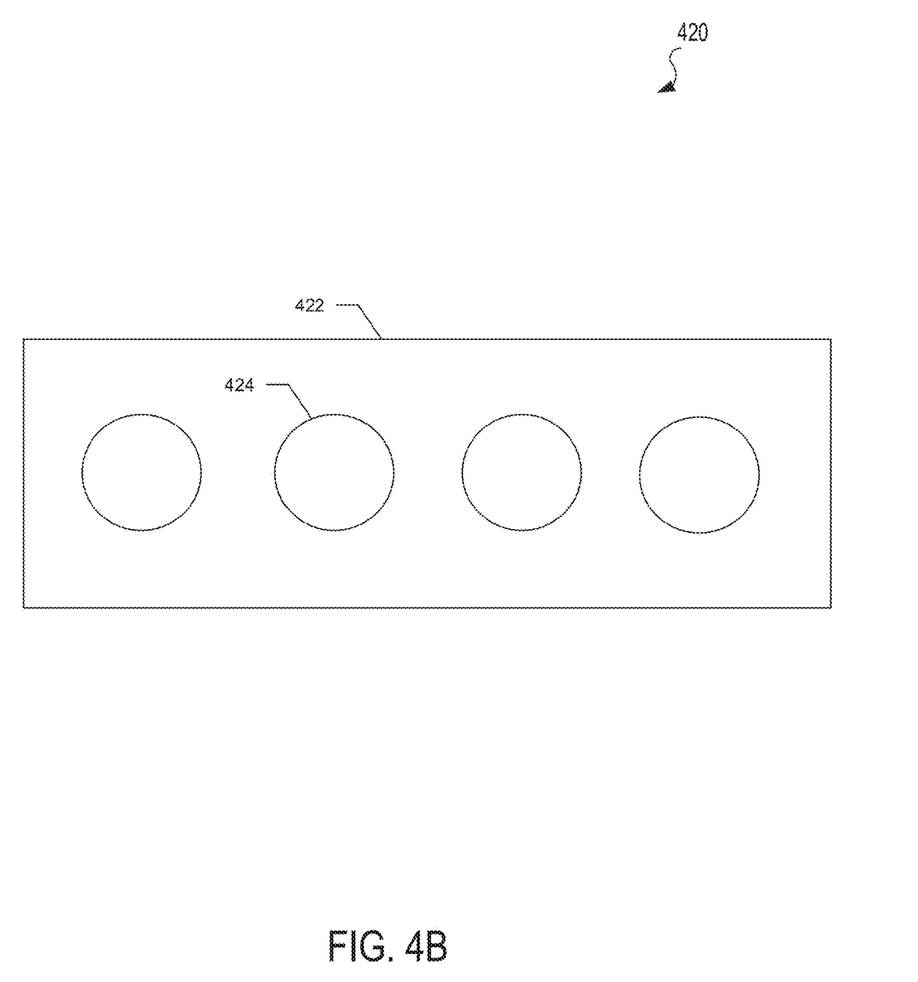

Alternatively to the spherical core-shell nanoparticle 400, other non-spherical forms of nanoparticles may be used to reduce the degree of film densification that may occur upon sintering. For example FIG. 4B shows a nanoparticle-matrix composite layer 420 in which the matrix material 422 forms a single flat matrix layer that separates individual nanoparticles of core material 424. The matrix material 422 may include tantalum oxide or any other suitable high temperature stable material (e.g. a metal oxide which is stable up to 700° C.). The core material 424 may be any type of electrochemically active material, for example the materials discussed in relation to the composition of the working electrode 104. The nanoparticle-matrix composite layer 420 may be formed using atomic layer deposition or through deposition of polyoxometalates. Other examples of non-spherical structures may include nanorods (e.g. bronze nanorods), porous web structures such as $NbO_X$ web structures used as a matrix, or polyoxometalate web or matrices. The working electrode 104 may in addition or alternatively contain dopants that suppress undesirable nanoparticle crystallization, sintering, or phase transitions during the heat tempering process, or to promote desirable crystallization or phase transitions. These various structures may also serve, or be combined with other materials to serve as the protective layer 118.

Use of the core-shell nanoparticle 400 or other materials or dopants to prevent sintering or other unwanted changes in the electrodes of an electrochromic device during tempering may allow for large scale production of electrochromic devices. Developing a material composition and process condition that can maintain performance after the manufacturing process may also lead to lower cost products. Electrodes containing materials that suppress undesirable nanoparticle crystallization, sintering, or phase transitions during heat tempering may enable deposition of liquid coatings on large form factor glass substrates, forming "jumbo" electrodes. For example, the jumbo electrodes may have dimensions of at least 4 feet by 4 feet, such as 8 feet by 8 feet, 8 feet by 4 feet, 12 feet by 4 feet, 12 feet by 41 feet or 3.66 m by 12.5 m, or any other common dimensions for windows or form-factor glass substrates (e.g., up to 12 m by 18 m). These jumbo electrodes may then be shipped to third parties that may cut the substrates containing such electrodes to size, temper them, and assemble the electrodes into various products. For example, the cut and tempered glass substrate containing the electrode may be assembled together with a counter electrode and an electrolyte into a dynamic glass pane. The dynamic glass pane is then installed as an outer pane of glass in a double pane window unit.

The jumbo electrodes may be shipped as flat planes, or may be flexible and can be shipped in rolls. The ability to produce electrodes on jumbo sized substrates may enable low cost of production of electrodes and electrochromic devices, with more freedom in product sizes and shapes.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An electrochromic device, comprising:
   a working electrode;
   a counter electrode; and
   an electrolyte deposited between the working electrode and the counter electrode;
   wherein:
      at least one of the working electrode and the counter electrode comprises a high temperature stable material and nanoparticles of a core material;
      the high temperature stable material forms a matrix around the nanoparticles of the core material; and
      the high temperature stable material prevents fusing of the nanoparticles of the core material at temperatures up to 700° C.

2. The device of claim 1, wherein the high temperature stable material forms a single flat layer surrounding the core material.

3. The device of claim 1, wherein the high temperature stable material comprises tantalum oxide.

4. The device of claim 1, wherein the working electrode comprises the high temperature stable material and the nanoparticles of the core material.

5. The device of claim 4, wherein the nanoparticles of the core material comprise at least one of niobium oxide, tungsten oxide, molybdenum oxide, titanium oxide, or vanadium oxide nanoparticles.

6. The device of claim 4, wherein the nanoparticles of the core material comprise active core doped or undoped tungsten oxide nanoparticles.

7. The device of claim 1, wherein the counter electrode comprises the high temperature stable material and the nanoparticles of the core material.

8. The device of claim 7, wherein the nanoparticles of the core material comprise at least one of cerium oxide, titanium dioxide, cerium vanadate, indium oxide, tin-doped indium oxide, tin oxide, manganese-doped tin oxide, antimony-doped tin oxide, zinc oxide, aluminum-doped zinc oxide, iron oxide, vanadium oxide, chromium oxide, manganese dioxide, cobalt oxide, nickel oxide, rhodium oxide, or iridium oxide nanoparticles.

9. The device of claim 1, wherein both the counter electrode and the working electrode comprise the high temperature stable material and the nanoparticles of the core material.

10. The device of claim 1, further comprising a glass substrate.

11. A method of forming an electrochromic device, comprising:
    depositing an electrode onto a first substrate, wherein the electrode comprises a high temperature stable material and nanoparticles of a core material; and
    heating the electrode and the first substrate to temperatures up to 700° C.,
    wherein:
       the high temperature stable material forms a matrix around the nanoparticles of the core material; and
       the high temperature stable material prevents fusing of the nanoparticles of the core material during the heating.

12. The method of claim 11, wherein the high temperature stable material forms a single flat layer surrounding the core material.

13. The method of claim 11, wherein the high temperature stable material comprises tantalum oxide.

14. The method of claim 11, wherein the heating comprises tempering.

15. The method of claim 11, wherein the first substrate comprises a glass substrate.

16. The method of claim 11, wherein the electrode comprises a working electrode of the electrochromic device.

17. The method of claim 16, wherein the nanoparticles of the core material comprise at least one of niobium oxide, tungsten oxide, molybdenum oxide, titanium oxide, or vanadium oxide nanoparticles.

18. The method of claim 16, wherein the nanoparticles of the core material comprise active core doped or undoped tungsten oxide nanoparticles.

19. The method of claim 16, further comprising:
    depositing a counter electrode onto a second substrate;
    heating the counter electrode and the second substrate; and
    forming an electrolyte between the working electrode and the counter electrode.

20. The method of claim 11, wherein the electrode comprises a counter electrode of the electrochromic device.

21. The method of claim 20, wherein the nanoparticles of the core material comprise at least one of cerium oxide, titanium dioxide, cerium vanadate, indium oxide, tin-doped indium oxide, tin oxide, manganese-doped tin oxide, antimony-doped tin oxide, zinc oxide, aluminum-doped zinc oxide, iron oxide, vanadium oxide, chromium oxide, manganese dioxide, cobalt oxide, nickel oxide, rhodium oxide, or iridium oxide nanoparticles.

22. The method of claim 20, further comprising:
    depositing a working electrode onto a second substrate;
    heating the working electrode and the second substrate; and
    forming an electrolyte between the working electrode and the counter electrode.

23. The method of claim 11, wherein the first substrate is a jumbo glass substrate and the method further comprises:
    cutting the first substrate after depositing the electrode onto the first substrate;
    assembling the electrode and the first substrate with a second electrode and an electrolyte into a dynamic glass pane; and
    providing the dynamic glass pane as an outer pane of glass in a double pane window unit.

24. The method of claim 11, further comprising quenching the electrode and the first substrate to temperatures less than 100° C., wherein the quenching occurs over a period of seconds.

* * * * *